Aug. 14, 1956

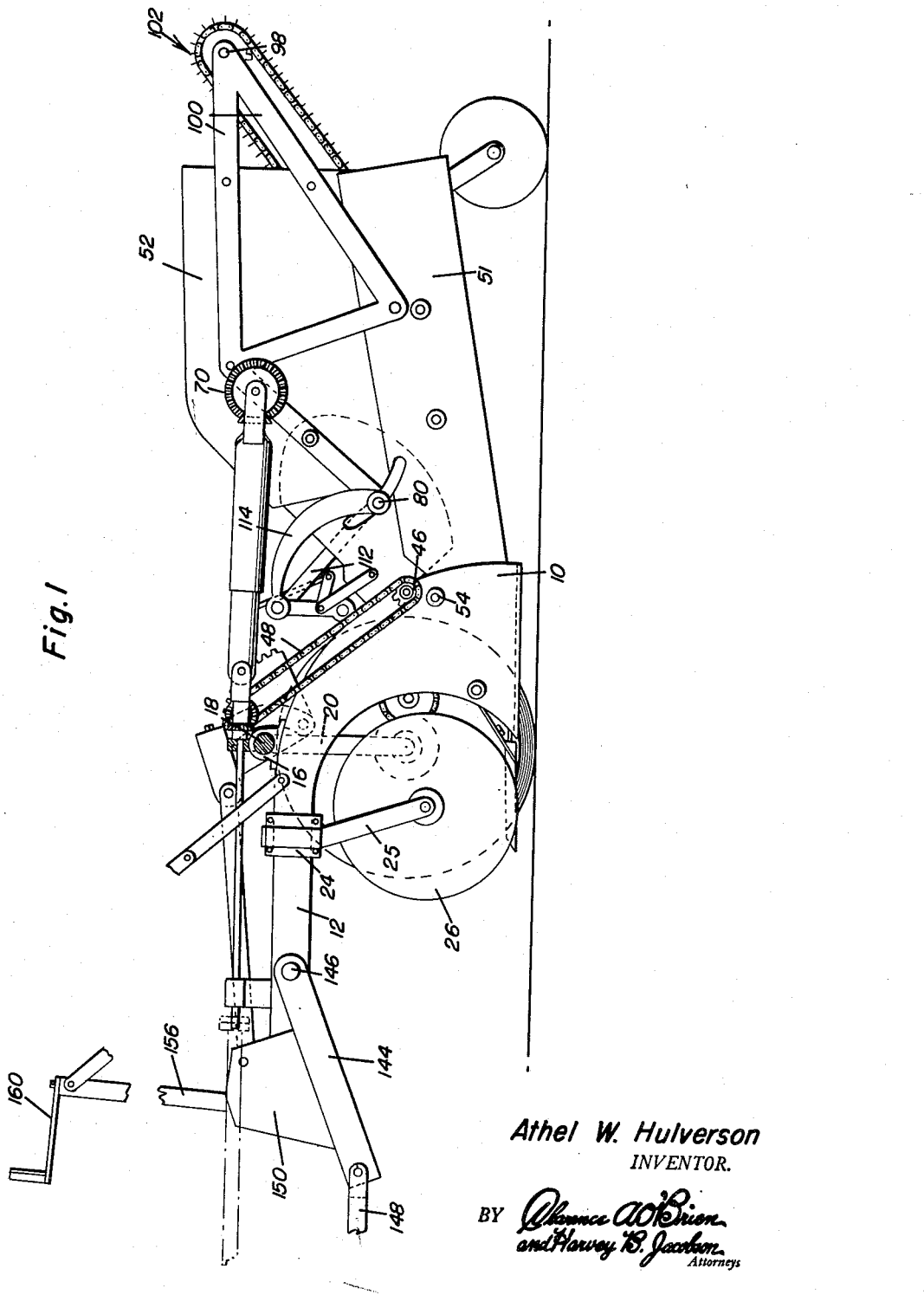

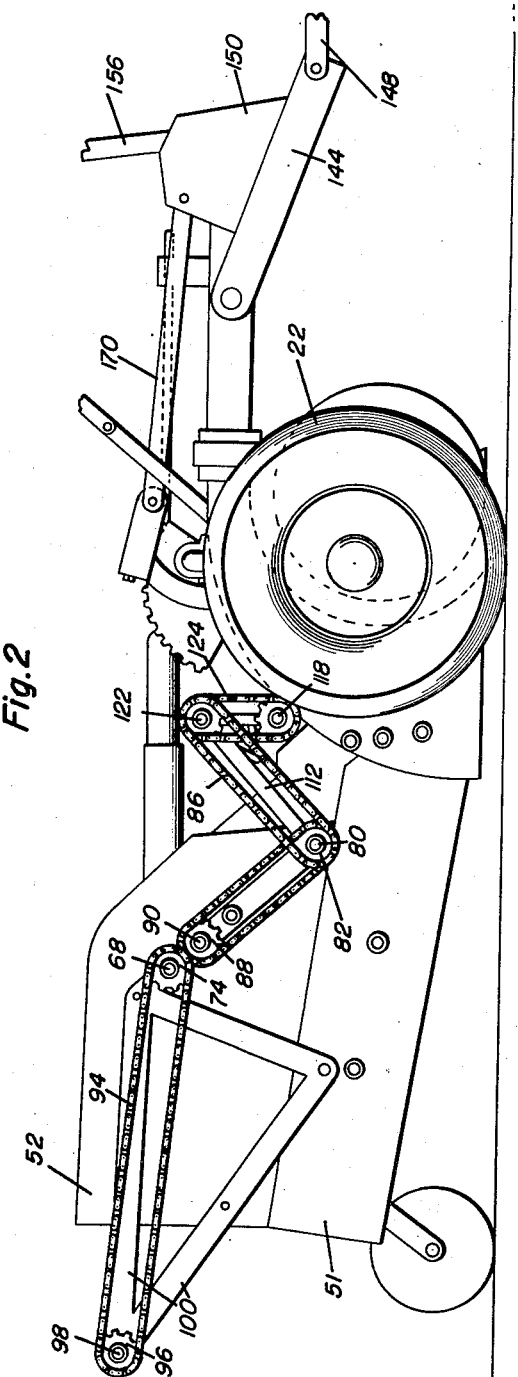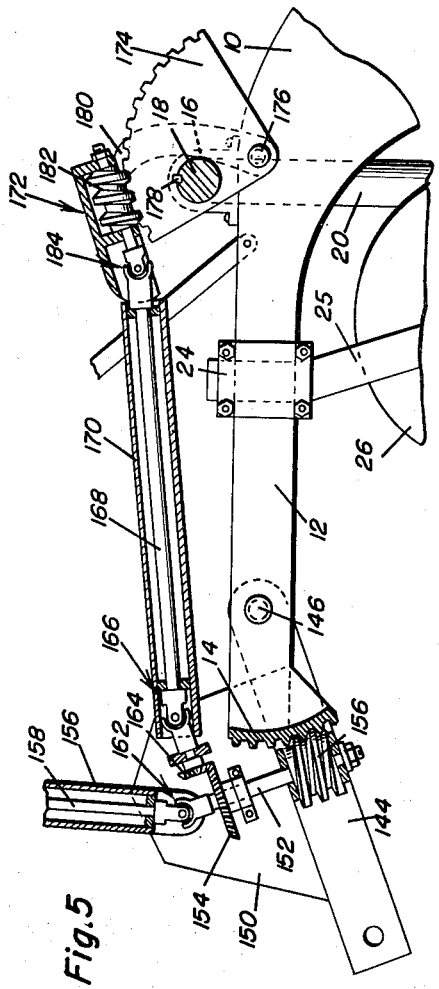

A. W. HULVERSON 2,758,528

ROOTER EXTRACTOR

Filed Sept. 4, 1953

Athel W. Hulverson
INVENTOR.

BY
Attorneys

United States Patent Office 2,758,528
Patented Aug. 14, 1956

2,758,528

ROOT EXTRACTOR

Athel W. Hulverson, Hastings, Minn.

Application September 4, 1953, Serial No. 378,467

6 Claims. (Cl. 97—10)

This invention relates generally to a machine for extracting roots and weeds from soil and pertains more particularly to an improved form of such machine.

A primary object of this invention is to provide an improved machine of the character described which is constructed of articulated sections enabling adjustment in the depth of soil penetration to permit the machine to be adapted to various soil conditions.

Another object of this invention is to provide an improved root extractor which incorporates articulated forward and rearward sections, the front or forward section being supported by a pair of spaced wheels carried at opposite sides of a U-shaped axle and the rear section having a fixed earth penetrating shovel, whereby varied angular dispositions between the front and rear sections effect varied depths of penetration of the shovel.

Another object of this invention is to provide an improved form of a root extractor in conformity with the foregoing objects which includes draft arms extending forwardly from the front section, an implement-connected link pivotally secured to the draft arms, and mechanism for varying the angular disposition between the link and draft arms and consequently, the angular disposition between the front and rear sections for effecting the varied soil penetrations.

A further object of this invention is to provide an improved form of root extractor which incorporates improved drive means, the same deriving its power from a common source.

A still further object of this invention is to provide an improved form of root extractor which is provided with a mechanism for directing the strip of soil rearwardly of the machine, a soil pulverizing assembly, and a root and weed conveyor for passing such vegetation to a discharge point.

Another object of this invention is to provide an improved root extractor in conformity with the foregoing objects wherein mechanism is provided for expediently handling the strips of various thicknesses.

Still another object of this invention is to provide an improved root extractor including means associated with its pulverizer mechanism of deflecting rocks and the like to one side of the machine.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the improved root extractor;

Figure 2 is another side elevational view of the root extractor taken from the opposite side of Figure 1;

Figure 5 is an enlarged vertical section taken substantially along the plane of section line 5—5 in Figure 3, showing the details of the adjusting mechanism.

Figures 3, 4:
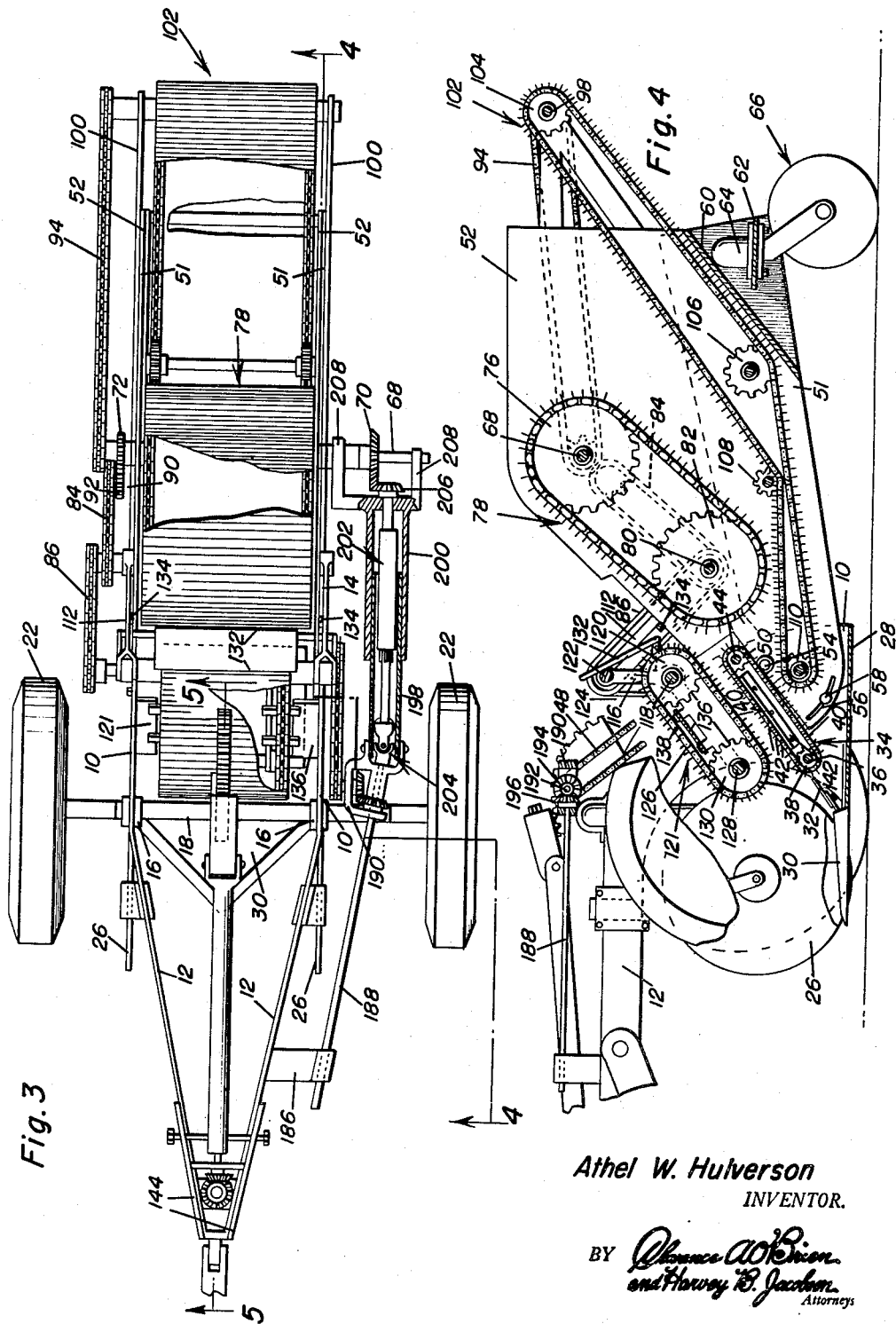
Figure 3 is a top plan view partly in section of the root extractor with portions thereof broken away to show details of internal construction.
Figure 4 is a vertical section taken substantially along the plane of section line 4—4 of Figure 3 showing further details of internal construction.

Referring now more particularly to the drawings, reference numeral 10 indicates a pair of spaced vertical side plates having the horizontal forwardly converging upper arm portions 12 which are secured together at their forward ends through the medium of the arcuate rack or gear sector 14 in the manner shown most clearly in Figure 5. The arm members 12 are provided on their upper edges with the bearing members 16, journaling bight portion 18 of a U-shaped axle member to the side plate assembly, the axle including the depending leg portions 20, the free ends of which are horizontally bent to journal the wheel members 22 at opposite sides of the machine. The arm members 12 also carry the bracket plates 24 to which the upper free ends of the rod members 25 are rigidly clamped and the lower free ends of these rod members are laterally bent to journal thereon the disk member 26 in the manner shown.

Between the lower edges of the side members 10 extends a reinforcing plate 28 for rigidly connecting the side members together, and a shovel plate 30 having a V-shaped cutting edge is suitably secured to the member 28 as a forward extension thereof, as seen most clearly in Figure 4. As seen most clearly in Figure 3, it will be noted that the disks 26 are in alignment with the longitudinally extending side plate 10 and that the shovel plate 30 extends between these disks and between the inner surfaces of the side plate portion 10. Also, the lower edges of the disks are disposed in alignment with the lower surface of the shovel plate 30 so that when these members are engaged with the ground surface, the disks will cut grooves therein with the shovel plate extending or projecting beneath the surface of the soil so that a strip of soil is extracted from the ground. The rear edge of the shovel plate 30 is provided with an inclined apron 32 and conveyor means, indicated generally by the reference character 34, is carried between the side plates 10 substantially as a continuation of this apron.

The conveyor assembly 34 incorporates an idler shaft 36 journaled at opposite ends in the side plates 10 and provided with longitudinally spaced sprockets 38 which engage the chain members 40 at opposite sides of the conveyor assembly and between which suitable clear members 42 are secured so that the conveyor assembly will engage the undersurface of the strip of soil removed from the ground. A drive shaft 44 is also journaled between the side plates 10 and one end of this shaft projects outwardly beyond its corresponding side plate wherein it is provided with the sprocket member 46 about which the flexible chain 48 entrains, the purpose of this chain being presently apparent. In a manner similar to the sprockets 38, the drive shaft 44 is provided with spaced sprockets 50 which engage the previously described chain 40.

Suitably formed frame members 51 are pivotally secured at their forward ends through the medium of the transverse pivot shaft 54 adjacent the rear edge of the side plates 10 and the extreme forward ends of these members 51 are provided with elongated arcuate slots 56 within which clamping bolt members 58 carried by the side plates 10 extend for permitting angular adjustment between the plates 10 and the members 51 in a manner presently described. Deflector plates 52 are rigidly secured to members 51 as vertical extensions thereof. The main body portion of the machine between the frame members 51 is open at its bottom, but the rearward ends of the members 51 are interconnected by the inclined reinforcing apron 60 and a suitable bracket 62 also inserted therebetween to provide a support for the pivot boss 64 forming a caster attachment for the wheel assembly 66 to support the rearward portion of the members 51.

A drive shaft 68 is journaled at opposite sides in the plates 52 and the opposite ends of this shaft extend outwardly therebeyond and are provided at one side with the bevel gear 70 and at the opposite side with a spur gear 72 and drive sprocket 74 for a purpose presently apparent. The shaft 68 is provided adjacent each of the side plates 52 with a sprocket 76 forming a drive for the conveyor assembly indicated generally by the reference character 78 which is formed of chains and cleat members in a manner similar to the previously described conveyor assembly 34. An idler shaft 80 is journaled in and extended beyond the opposite sides of the plate members 52 and carries the idler sprocket 82 completing the conveyor assembly 78. One end of the shaft 80 carries a pair of sprockets 82 receiving the flexible chains 84 and 86, the chain 84 being also entrained about the sprocket 88 on shaft 90, which shaft carries a spur gear 92 in engagement with the previously described spur gear 72 of the shaft 68. Thus, drive is imparted from the shaft 68 to the chain member 86 without effecting undue strain on the conveyor assembly 78. The previously described sprocket 74 is associated with the chain 94 which extends rearwardly for engagement with a sprocket 96 on a shaft 98 journaled at opposite ends between the brace arms 100 and which imparts drive to the discharge conveyor assembly indicated generally by the reference character 102. The conveyor assembly 102 incorporates sprockets 104 on the shaft 98 and associated chain and cleat members in a manner similar to the previously described conveyor assembly 34. Suitable idler sprockets 106, 108 and 110 are provided for maintaining the chains of the assembly 102 taut and it will be noted that the end idler sprockets 110 are disposed below and forwardly of the previously described sprockets 50 of the previously described conveyor assembly 34, the purpose of this construction being presently apparent.

The shaft 80 has associated therewith at opposite sides the arm members 112 and 114, which are pivotally secured at their free ends to link members 116 which, in turn, journal the drive shaft 118 carrying the sprocket members 120 inwardly of the side plates 10 for receiving the upper conveyor assembly indicated generally by the reference character 121. The pivotal securement between the arms 112 and 114 and the associated links 116 is effected by means of the transverse shaft 122 which is powered by the previously described chain member 86 and which includes sprocket means for driving the chain 124 which imparts drive between the shafts 118 and 122. A spacer rod 126 is provided adjacent each end of the shafts 118 and 128 and the latter is provided with a sprocket member 130 receiving in conjunction with the previously described sprockets 120, the associated chain and cleat members of the conveyor assembly 121. Since the arms 112 and 114 are free to turn on the shaft 80, and likewise, the links 116 on the shaft 122, it will be noted that the conveyor assembly 121 may shift relative to the main body portion of the extracting machine, so as to accommodate various thicknesses of soil strips carried onto the lower conveyor assembly 34, as will be readily apparent.

A deflector plate 132 is secured by suitable means to the links 116 and this plate extends transversely of the machine and may be slanted towards one side thereof or towards the arm 114, which arm is of arcuate configurations as shown to allow rocks and large clods to pass outwardly of the machine beneath this arm and over the upper inclined edge of the associated side plates 52. Suitable stop members 134 are provided to project beneath the arm members 112 and 114 to limit their downward pivotal motion and the guard plates 136 carried by the arms 126 engage the stop members or brackets 138 with the upper conveyor assembly 121 in its lowermost pivotal position. Likewise, the lower conveyor assembly 34 may be associated with a guide plate 140 having depending side flanges 142 at its opposite ends for attachment to the side plates 10, this guide plate offering support to the upper flight of the conveyor assembly 34.

Referring now more particularly to Figures 1, 3 and 5, it will be seen that the forward ends of the arms 12 pivotally carry the forwardly extending leg members 144 which are mutually converging and secured together at their forward ends, their rearward ends being pivotally connected through the medium of the shaft member 146 to the draft arms 12. The clevis link 148 receives the forward end of the leg 144 and is connected to an associated tractor drawbar (not shown). Plate members 150 attached to the legs 144 and the leg members themselves journal a substantially vertical shaft 152 provided with a bevel gear 154 and a worm 156 in engagement with the previously described segment 14. An elongated tubular housing 156 is suitably pivoted between the plates 150 at its lower end and this housing journals a longitudinally extending shaft 158 provided at its upper end with a crank 160, the shafts 152 and 158 being interconnected by means of the universal joint member 162. A stub shaft carrying a bevel gear 164 mating with the bevel gear 154 is journaled on the plate 150 and this stub shaft is connected by means of a universal joint 166 to a longitudinally extending shaft 168, both within the housing 170 which is suitably secured in its forward end to the plates 150 and pivotally secured at its other end to the housing member 172. A sector 174 is pivoted at its apex by means of a pin 176 to arms 180 depending from housing 172 and straddling the sector. This sector is apertured to receive the bight portion 18 of the axle assembly to which it is suitably secured as by the key member 178. The housing 172 journals a worm 182 in engagement with the sector 174 and coupled through the universal joint assembly 184 to the shaft 168. By this construction, it will be manifest that rotation of the shaft 158 through the medium of the crank 160 will cause the angular disposition between the arms 12 and 144 to be changed as the worm 156 advances in one direction or another on the rack 14 and, simultaneously, the angular disposition between the axle assembly and the side plates 10 will be changed by rotation of the sector member 174 by virtue of the keyed connection between the sector and bight portion of the axle. In this manner, the forward end of the machine and consequently the shovel point 30 will be simultaneously angled downwardly and dropped with relation to the wheel member 22 in response to movement of the shaft 158 in one direction. Conversely, rotation of the shaft 158 in the opposite direction will raise the forward end of the machine to a portable position as shown in Figures 1 and 4. It will be manifest that this assembly rapidly and efficiently permits the shovel point and the disks to penetrate the desired distance below the surface of the ground.

As most clearly seen in Figure 3, one draft arm 12 is provided with a bearing bracket 186 by means of which a power take-off extension 188 is journaled thereon with the free end of this shaft being journaled within the bracket member 190 rotatably received on an idler shaft 192 journaled to a corresponding side plate 10. This shaft 192 is provided with a bevel gear 194 in engagement with a similar gear 196 on the power take-off shaft 188 and is also provided with a sprocket member in engagement with the previously described chain 48 imparting the drive to the lower conveyor assembly 34. An inner housing 198 is pivotally carried by the bracket 190 to extend telescopically within the outer housing member 200 and an extensible shaft assembly 202 extends longitudinally within these housings and is connected at one end by the universal joint 204 to the shaft 188 and is provided at the top with a bevel gear 206 mating with the previously described bevel gear 70 on the shaft 68, the free end of the housing assembly 198, 200 being provided with offset arm member 208 journaled on the shaft 68 so as to lend support to the housing assembly.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A root extracting machine comprising a forward section including a pair of spaced side walls having forwardly projecting arm portions, a pair of leg members pivotally connected to and projecting forwardly from said arm portions, means for selectively positioning said leg members with respect to said arm portions, a horizontally disposed shovel member secured between said side walls, a U-shaped axle pivotally connected at its bight to said side walls and provided at the free ends of its legs with supporting wheels, said means including mechanism for selectively pivoting said axle to raise and lower said shovel, a second section pivotally secured to the forward section in trailing relation thereto, said second section including a conveyor assembly disposed behind said shovel member to receive a strip of earth gathered thereby, a second conveyor assembly disposed to receive a strip of earth from the first mentioned conveyor assembly, and means on said second section for pulverizing a strip of earth on said second conveyor assembly, said second conveyor assembly being porous and extending to a discharge point at the rear of the machine for permitting pulverized earth to fall therethrough and convey roots retained thereon to the discharge point.

2. A root extracting machine comprising a forward section including a draft tongue, a horizontally disposed shovel member and supporting wheels, a second section pivotally secured to the forward section in trailing relation thereto, a conveyor assembly mounted on said forward section and including an upper flight disposed substantially as a continuation of said shovel member, a second conveyor assembly pivotally carried by said second section in overlying relation to the first conveyor assembly and in cooperation therewith to receive a strip of earth gathered by the shovel member, a third conveyor assembly mounted on said second section and positioned to receive a strip of earth from the first conveyor assembly, and means on said second section for pulverizing a strip of earth upon said third conveyor assembly, said third conveyor assembly being porous and extending to a discharge point at the rear of the machine for permitting pulverized earth to fall therethrough and convey roots retained thereon to the discharge point.

3. A root extracting machine comprising a forward section including a draft tongue, a horizontally disposed shovel member and supporting wheels, a second section pivotally secured to the forward section in trailing relation thereto, a conveyor assembly mounted on said forward section and including an upper flight disposed substantially as a continuation of said shovel member, a pair of spaced arm members pivotally carried at one end on said second section, a second conveyor assembly pivotally secured to the other end of said arms in overlying relation to the first mentioned conveyor assembly and in cooperation therewith to receive a strip of earth gathered by the shovel member, a third conveyor assembly mounted on said second section and positioned to receive a strip of earth from the first conveyor assembly, and means on said second section for pulverizing a strip of earth upon said third conveyor assembly, said third conveyor assembly being porous and extending to a discharge point at the rear of the machine for permitting pulverized earth to fall therethrough and convey roots retained thereon to the discharge point.

4. A root extracting machine comprising a forward section including a pair of spaced side walls having forwardly projecting arm portions, a pair of leg members pivotally connected to and projecting forwardly from said arm portions, means for selectively positioning said leg members with respect to said arm portions, a horizontally disposed shovel member secured between said side walls, a U-shaped axle pivotally connected at its bight to said side walls and provided at the free ends of its legs with supporting wheels, said means including mechanism for selectively pivoting said axle to raise and lower said shovel, a second section pivotally secured to the forward section in trailing relation thereto, said second section including a conveyor assembly disposed behind said shovel member to receive a strip of earth gathered thereby, a second conveyor assembly disposed to receive a strip of earth from the first-mentioned conveyor assembly, and means on said second section for pulverizing a strip of earth on said second conveyor assembly, said second conveyor assembly being porous and extending to a discharge point at the rear of the machine for permitting pulverized earth to fall therethrough and convey roots retained thereon to the discharge point, the first mentioned means including a gear sector secured to said arm portions, a worm rotatably carried by said leg members and meshing with said gear sector, a second gear sector rigid with the bight of said U-shaped axle, a second worm rotatably carried by said side walls and meshing with the second gear sector, and means for simultaneously rotating the first and second worms.

5. A root extracting machine comprising a forward section including a draft tongue, a horizontally disposed shovel member and wheels supporting said tongue, a second section pivotally secured to the forward section in trailing relation thereto, said second section including a conveyor assembly disposed behind said shovel member to receive a strip of earth gathered thereby, a second conveyor assembly disposed to receive a strip of earth from the first mentioned conveyor assembly, means for pulverizing a strip of earth upon the second conveyor assembly, said second conveyor assembly being porous and extending to a discharge point at the rear of the machine for permitting pulverized earth to fall therethrough and convey roots retained thereon to the discharge point, said draft tongue being formed of a pair of overlapping, articulated portions, and means for adjusting the angular disposition between said portions to vary the inclination of said shovel member.

6. A root extracting machine comprising a forward section including a draft tongue, a horizontally disposed shovel member and a U-shaped axle pivotally connected at its bight portion to said draft tongue and provided at the free ends of its legs with wheels supporting said tongue, a second section pivotally secured to the forward section in trailing relation thereto, said second section including a conveyor assembly disposed behind said shovel member to receive a strip of earth gathered thereby, a second conveyor assembly disposed to receive a strip of earth from the first mentioned conveyor assembly, and means for pulverizing a strip of earth upon the second conveyor assembly, said second conveyor assembly being porous and extending to a discharge point at the rear of the machine for permitting pulverized earth to fall therethrough and convey roots retained thereon to the discharge point, said draft tongue being formed of a pair of overlapping, articulated portions, means for simultaneously adjusting the angular disposition between said overlapping portions and the pivotal relation of said axle with respect to said draft tongue to vary the depth of penetration of said shovel member.

References Cited in the file of this patent

UNITED STATES PATENTS

| | | |
|---|---|---|
| 968,684 | Paulson | Aug. 30, 1910 |
| 1,771,025 | Barry | July 23, 1930 |
| 1,786,226 | Bradley | Dec. 23, 1930 |
| 1,802,211 | Lively | Apr. 21, 1931 |
| 2,060,688 | Pryor et al. | Nov. 10, 1936 |
| 2,302,973 | Sargent | Nov. 24, 1942 |